US012496594B2

(12) United States Patent
Waddelow et al.

(10) Patent No.: US 12,496,594 B2
(45) Date of Patent: Dec. 16, 2025

(54) MICRO-NOZZLE

(71) Applicant: TTP PLC., Melbourn (GB)

(72) Inventors: Simon Waddelow, Melbourn (GB); Jianye Wang, Melbourn (GB)

(73) Assignee: TTP plc., Melbourn (GB)

( * ) Notice: Subject to any disclaimer, the term of this patent is extended or adjusted under 35 U.S.C. 154(b) by 263 days.

(21) Appl. No.: 18/284,900

(22) PCT Filed: Mar. 29, 2022

(86) PCT No.: PCT/GB2022/050770

§ 371 (c)(1), (2) Date: Sep. 29, 2023

(87) PCT Pub. No.: WO2022/208062

PCT Pub. Date: Oct. 6, 2022

(65) Prior Publication Data

US 2024/0181474 A1 Jun. 6, 2024

(30) Foreign Application Priority Data

Apr. 1, 2021 (GB) ...................................... 2104736

(51) Int. Cl.
*B05B 1/16* (2006.01)
*B05B 15/18* (2018.01)
*B05B 15/40* (2018.01)

(52) U.S. Cl.
CPC ................ *B05B 1/16* (2013.01); *B05B 15/18* (2018.02); *B05B 15/40* (2018.02)

(58) Field of Classification Search
CPC ............ B05B 1/16; B05B 15/18; B05B 15/40
USPC ......... 239/575, 589, 589.1, 590, 590.3, 600, 239/602
See application file for complete search history.

(56) References Cited

U.S. PATENT DOCUMENTS

| | | | | |
|---|---|---|---|---|
| 4,185,777 | A * | 1/1980 | Bauer | F15C 1/22 239/600 |
| 5,845,845 | A * | 12/1998 | Merke | F15C 1/22 239/589.1 |
| 6,176,442 | B1 | 1/2001 | Eicher et al. | |
| 7,621,266 | B2 * | 11/2009 | Kladders | A61M 15/0068 239/600 |
| 8,662,421 | B2 * | 3/2014 | Russell | B60S 1/52 239/600 |
| 2004/0164186 | A1 | 8/2004 | Kladders et al. | |

(Continued)

FOREIGN PATENT DOCUMENTS

EP 3233500 A1 10/2017

OTHER PUBLICATIONS

PCT Patent Application No. PCT/GB2022/050770 International Search Report and Written Opinion dated Jun. 23, 2022.

*Primary Examiner* — Steven J Ganey
(74) *Attorney, Agent, or Firm* — Erise IP, P.A.

(57) ABSTRACT

An insert for a micro-nozzle (10), and a micro-nozzle (10) comprising such insert. The insert comprises a microfabricated fluidic chip (1) having an inlet, an outlet and one or more microfluidic channels connecting the inlet and outlet and an overmould casing (2) overmoulded around the fluidic chip (1) so as to substantially encase the fluidic chip (1), and comprising an inlet in fluid communication with the inlet of the chip and an outlet in fluid communication with the outlet of the chip.

17 Claims, 9 Drawing Sheets

(56) References Cited

U.S. PATENT DOCUMENTS

| | | | |
|---|---|---|---|
| 2010/0154792 | A1 | 6/2010 | Geser et al. |
| 2023/0111283 | A1* | 4/2023 | Waddelow ............ B01L 3/0268 422/502 |

* cited by examiner

MICRO-NOZZLE

RELATED APPLICATION

The present application is a national stage application under 35 U.S.C. § 371 of International Application No. PCT/GB2022/050770, filed Mar. 29, 2022, which claims priority to Great Britain Patent Application No. 2104736.0, filed Apr. 1, 2021. The above referenced applications are hereby incorporated by reference.

FIELD

The present invention relates to an insert for a micro-nozzle, a micro-nozzle employing such an insert and a method of manufacturing the insert and micro-nozzle.

Mechanical systems for aerosolising fluids (typically liquids) are highly effective for delivering pharmaceutical ingredients to the lungs, nose, eyes, skin or mouth. The aerosols generated by such systems are generally monodisperse and more controllable than those produced by typical pump sprays. As such, delivery can be targeted with fast uptake whilst minimising undesirable effects such as uncontrolled droplet distribution at the start up and end of the droplet delivery.

Such aerosols rely on forcing a liquid at very high pressures through micro-fabricated fluidic chips which comprise micro-fluidic channels for communication of fluid from an inlet to an outlet of the nozzle. Such chips are typically manufactured from layers of silicon or glass which are etched and then bonded together to cap the fluidic channels of interest. For economies of scale these chips are typically manufactured by producing a 'wafer' which comprises an array of many chips. To convert the wafer into the individual chips the wafer is 'diced' which typically will be via multiple passes of a slitting saw. The manufacturing process for such chips dictates that the chip typically takes a cuboidal form.

One of the key challenges in these micro-fluidic nozzle systems is that such a cuboidal chip leads to great difficulty in securely sealing the chip within an aerosol system which generally employs cylindrical or conical form factors. Furthermore, such chips, being manufactured from layers of fragile material, are liable to become delaminated when they experience the extremely high pressures required for operation of an aerosol system. Whilst it is desirable that the chip does not become damaged or delaminated in use, it is vitally important that the high operational pressures are not compromised. There is therefore a need for a nozzle device which reliably provides delivery of high pressure, high velocity aerosols whilst ensuring structural integrity of the fluidic chip under the high pressures experienced by the nozzle in use.

SUMMARY OF INVENTION

According to an aspect there is provided an insert for a micro-nozzle, the insert comprising: a microfabricated fluidic chip having an inlet, an outlet and one or more micro-fluidic channels connecting the inlet and outlet; an overmould casing overmoulded around the fluidic chip so as to substantially encase the fluidic chip, and comprising an inlet in fluid communication with the inlet of the chip and an outlet in fluid communication with the outlet of the chip.

The overmould casing (sometimes referred to herein as 'the overmould', 'the overmould case' or 'the casing') provides a particularly useful function of providing a housing to tightly seal the fluidic chip within the insert. In effect, the overmould casing converts a generally cuboidal chip component into a form which is more readily sealed and integrated into a hydraulic system. Furthermore, the overmould may also provide a protective layer for the chip within the insert so as to protect fragile components, which for example may be manufactured from glass and/or silicon. The insert of the present invention has a further advantage in that the ease of sealing through the overmoulded casing allows functional inspection to occur earlier in the assembly process thus increasing consistency of production and increasing output of viable products. An overmoulded casing has a significant advantage that it is able to effectively convert the form of the chip to one which is more readily installed in a nozzle system, whilst maintaining a particularly strong and tight seal around the interface of the chip, due to the tight seal created by an overmoulding process.

The overmould casing may further comprise means such as one or more grooves, recesses and/or flanges to allow the overmould itself to act as a housing for further components of the micro-nozzle. For example, the overmould may comprise a sub-housing which allows the overmould itself to act as a housing for a cylindrical porous filter, such that the filter is held and sealed within the nozzle system by the overmould itself. In some examples the overmould casing may comprise a filter retaining wall that separates the porous filter from the fluidic chip. This may prevent hydraulic impulses that are applied to the porous filter when a device incorporating the insert is fired from being transmitted to the fluidic chip.

Typically, the overmould casing may comprise a retainer for mounting and retaining the insert within the housing of a micro-nozzle. The retainer may be arranged to mount and retain the insert within the micro-nozzle such that, in use, pressure at an inlet side of the casing is isolated from pressure at an outlet side of the casing. Thus, the retainer may perform a dual function of providing a means for attaching the insert to the housing of a micro-nozzle, and also of providing a separation within the housing so as to isolate the pressure of the inlet side from the pressure of the outlet side. In some examples, two or more separate retainer components may be employed to perform each of those functions.

The retainer may employ one or more attachment and/or retention means.

For example, the retainer may comprise a simple flange, arranged to engage with a complimentary flange or groove in the nozzle housing so as to provide a mounting means for the insert within the housing. In such an example the flange of the insert may rest and/or be held against the flange or groove of the housing such that the insert is held within the housing, and such that there is an air-tight connection which isolates pressure on both sides of the insert. Conversely, the retainer may comprise grooves which can engage with a complimentary groove or flange in the housing to provide the functionality as described above. The retainer may comprise one or more protrusions arranged to engage a complimentary member on the housing in a similar manner as that described above for a flange. For example, the retainer may comprise a bayonet attachment, wherein one or more protrusions of the retainer may be arranged to slot into one or more corresponding grooves or channels in the housing, and secured by guiding each of the protrusions to a position in each of the grooves or channels. In other examples, the retainer may comprise a cross-pin attachment, arranged to provide a cross-pinned joint with the housing of the nozzle.

In some examples, the retainer may comprise a weldable joint for providing a welded joint between the insert and the housing of the nozzle. The retainer may be arranged to provide one or more of ultrasonic welding, laser welding, spin welding or chemical welding between the insert and the housing.

In some examples, the retainer is arranged to be adhesively mounted to the housing of the nozzle. For example, the retainer may be arranged to provide a bonded joint, affixed to the housing through a suitable chemical adhesive.

The retainer may comprise other means, for example a threaded joint. For example the retainer may comprise a threaded surface arranged to engage with a complimentary threaded surface on the housing of the nozzle. The insert may then be screwed into position and held there by use of the threaded joint. Such a threaded joint may provide a secure fastening between the insert and the housing without the need for additional adhesive or welding. However, if necessary, the threaded joint may be further bolstered by an adhesive or welding. In addition, the threaded joint may also be further provide increased security of the pressure isolation between the inlet and outlet sides of the insert.

One or more retainers may comprise means for providing additional sealing members. For example, one or more of the retainers on the overmould casing may be arranged to host an o-ring to improve the seal between the casing and the housing of the nozzle system. Such a retainer may comprise a groove or a boss within or against which the o-ring can be hosted.

The overmould casing may comprise one or more windows. A window may comprise an opening through which a portion of the chip held within the casing may be exposed. Alternatively, or in combination, the window may comprise a region of reduced material thickness, such that the chip held within the casing is not directly exposed but is subjected to more of the external conditions (such as pressure) than at other regions of the casing. Such a region may be integral with the rest of the casing, or may be provided by a separate component attached to the casing. For example the window may comprise a thin membrane covering an otherwise exposed region on the overmould casing. The one or more windows may fulfil a number of functions, some of which are described below.

The overmould casing may comprise one or more pressure transferring windows. The pressure transferring windows may be arranged, in use, to transfer pressure at the inlet side of the overmould casing to one or more regions of the fluidic chip contained within the overmould casing. Typically, the fluidic chip may comprise one or more side walls, and the one or more pressure transferring windows may be arranged to transfer pressure at the inlet side of the overmould casing to the one or more side walls of the chip.

The pressure transferring windows may allow the side walls of the fluidic chip to be exposed to the system hydraulic pressure in use. As noted above, fluidic chips used for this purpose may often comprise multiple layers which can often become delaminated in use. The system hydraulic pressure applied through the pressure transferring windows may effectively clamp the layers of the chip together so as to maintain the structural integrity of the chip and prevent delamination. By simply exposing regions of the chip to the hydraulic pressure of the nozzle, the pressure transferring windows provides a simple, passive solution wherein the chip can be clamped in piece without the need for additional force or active components. As a result, the hydraulic load may be applied to the chip externally as well as internally, so the sub-assembly pressure rating is not limited by the bond strength of the microfluidic chip.

The overmould casing may comprise one or more locating windows. A locating window may allow the location of components to be encased by the overmould casing whilst the casing is overmoulded around those components. For example, a chip locating window may allow the chip to be located when the casing is being overmoulded around the chip. In an example manufacturing process, the chip may be held by a chip locator, whilst the overmould casing is overmoulded around the chip. The chip locating window allows the chip locator to hold the chip in place to maintain its position whilst the overmould casing is formed around the chip. Locating windows, such as chip locating windows, may be positioned on the inlet side, outlet side, or lateral sides of the overmould casing. Whilst locating windows may typically be openings through which the chip can be directly located by a locator, in some examples the locating windows may comprise regions of reduced thickness or susceptibility, such that the chip can be located by indirect means such as magnetic field.

Two main types of windows have been described above. In some example inserts, a window may provide the functionality of both pressure transferring windows and chip locating windows. For example, a chip locating window on the inlet side of the insert may be specifically arranged to expose a portion of the chip so as to provide supporting pressure to the chip. In this way, a chip locating window may be arranged, in use, to transfer pressure at the inlet side of the overmould casing to the fluidic chip. Equally, a pressure transferring window may be used during manufacture to locate or hold the fluidic chip.

It will be appreciated that the chip locating windows discussed above (and any pressure transferring windows which help locate a fluidic chip during manufacture) may be cavities or voids extending through the overmould casing defined during the moulding process by the presence of a chip locator (or similar device) that supports or grips the fluidic chip as it is overmoulded. In effect the extents of the chip locator within a mould or cast where the overmould casing is to be formed may define the extents of the windows in the overmould casing after overmoulding and once the chip locator is removed from the mould or cast.

In particularly preferred examples the overmould casing comprises one or more chip locating windows and/or at least one pressure transferring window, and said one or more chip locating windows and/or at least one pressure transferring window are partially or fully filled with an elastomer, wherein preferably the elastomer is arranged to transfer pressure to one or more side walls of the fluidic chip. More preferably still the elastomer is arranged to transfer pressure at the inlet side of the overmould casing to the one or more side walls of the fluidic chip (although this is not essential). The chip locating windows and/or pressure transferring windows filled with elastomer may comprise any of the features of the corresponding windows described above.

Elastomers are flexible, deformable and resilient. Therefore, pressures or loads applied to an exterior surface of the elastomer within each of these windows may be transferred through the elastomer to the fluidic chip. Compressing or deforming a free surface of the elastomer will cause forces to be applied through the body of the elastomer to the fluidic chip. As such, the fluidic chip may still be exposed to the system hydraulic pressure from the inlet side of the fluidic chip during use through the pressure transferring windows or chip locating windows in the overmould casing via the elastomer. Applying forces to the sides of the fluidic chip in this manner may act to clamp the layers of the chip together to maintain structural integrity and prevent delamination.

Providing an elastomer within the windows of the overmould casing also reduces the risk that any air is trapped within the windows during assembly or use of a micro-nozzle or use. Such unwanted trapped air (or other gases) can prevent the transfer of system hydraulic pressure to the fluidic chip and therefore could lead to damage or delamination of the fluidic chip.

The elastomer may comprise a natural or synthetic rubber (e.g. silicone, butadiene rubber, or styrene-butadiene rubber). Preferably the elastomer is less rigid than the overmould casing. Indeed where the overmould casing comprises a rigid polymer the elastomer may be significantly less rigid than the overmould casing.

The chip locating windows and/or pressure transferring windows may be filled with elastomer (i.e. elastomer may be provided into said windows) during a secondary moulding or potting process which follows the moulding process used to produce the overmould. The elastomer preferably fully (i.e. entirely) fills the windows. Therefore, gases and liquids are excluded from the windows.

In preferred examples the elastomer may extend or project away from the windows in the overmould so as to, in use, engage a housing (e.g. a male housing as discussed below) of a micro-nozzle in which the insert is positioned. As such elastomer may provide shock absorption between the housing and insert, improving safety and structural integrity. Furthermore the elastomer may may be configured to provide a tight seal (e.g. a watertight and/or airtight seal) between the insert and the housing. For instance, the elastomer may extend around the perimeter of a bore of the overmould casing. As such, the elastomer may replicate or replace the o-rings discussed below, thereby reducing component numbers and simplifying manufacture and assembly.

In preferred embodiments the insert may comprise circumferential positioning component(s) configured to ensure the insert is correctly aligned circumferentially with the housing of a nozzle in use. Preferably the insert may only be inserted or received within a housing of a nozzle in a correct orientation—i.e. the insert may be prevented from being received in the housing in an incorrect alignment. For instance, the overmould casing may comprise: one or more circumferential positioning projections, said circumferential positioning projection being configured to be received in a corresponding circumferential positioning recess formed in the nozzle housing (e.g. a male housing as discussed below); and/or one or more circumferential positioning recesses, said circumferential positioning projection being configured to receive a corresponding circumferential positioning projection in the nozzle housing (e.g. a male housing). Using such projections the insert may be easily and correctly positioned or aligned relative to the nozzle housing in a circumferential direction (e.g. a direction that extends around the longitudinal direction in which fluid is intended to move through the nozzle). Alternatively, the overmould casing and/or housing may be provided with exterior markings indicating a correct alignment. Such alignment components are particularly beneficial where the insert has a cylindrical or conical form.

According to another aspect, there is provided a micro-nozzle comprising: a female housing enclosing a nozzle chamber and having a nozzle outlet; an insert according to the first aspect as described above positioned within the nozzle chamber such that the outlet side of the insert is adjacent to the nozzle outlet; a male housing arranged to channel fluid from a fluid source to the inlet side of the insert, the male housing having a ridge arranged to engage the flange of the insert so as to seal the insert in place within the female housing.

By using an insert which is able to securely and tightly seal a fluidic chip within the nozzle, it is possible to provide a nozzle with increased high pressure output which is reliable and safe to use with reduced risk of damage or delamination of the fluidic chip. The micro-nozzles according to this aspect of the invention may comprise any of the optional or preferable features discussed previously with reference to the previous aspect of the invention and offer corresponding benefits. In particular, the micro-nozzles may comprise one or more chip locating windows and/or pressure transferring windows that are partially or fully filled with an elastomer as discussed above.

Preferably the micro-nozzle comprises a porous filter arranged to filter the fluid upstream of the fluidic chip and wherein the fluidic chip and porous insert are separated by a filter retaining wall. For instance, the porous filter may be housed in a sub-housing formed within the insert (as previously discussed) or within a sub-housing within the male housing. Separating the porous filter and insert by a filter retaining wall is advantageous because the porous filter typically experiences a hydraulic impulse loading when a system or device comprising the micro-nozzle is fired. If the porous filter is provided in contact with the filter this significant impulse can be applied to the fluidic chip which may lead to fracture of the delicate fluidic chip. In contrast by providing a filter retaining wall— which may form part of the male housing or the overmould casing— the loading on the porous filter may be carried or borne by filter retaining wall of the male housing or overmould casing rather than the fluidic chip. The filter retaining wall is preferably rigid— e.g. being formed of a rigid polymer—so as to withstand the forces involves. Preferably the filter retaining wall comprises an aperture or opening through which fluid may pass between the porous filter and the fluidic chip.

According to another aspect, there is provided a method of manufacturing the insert and nozzle according to the above aspects.

In particular there is provided a method of manufacturing a micro-nozzle, comprising the steps of: providing a fluidic chip having an inlet and an outlet; injection moulding an overmould case around the fluidic chip so as to substantially encase the chip, leaving the inlet and outlet of the chip exposed; allowing the overmould to shrink around the chip so as to provide a tightly sealed casing around the chip, and mounting the overmould casing in a housing of a nozzle system.

The overmould and micro-nozzles produced through such a method may comprise any of the optional or preferable features discussed with reference to the previous aspects of the invention and offer corresponding benefits.

Providing a fluidic chip may comprise providing two or more layers of silicon or glass which are etched and then bonded together to cap the fluidic channels of interest. For economies of scale a plurality of chips may be manufactured simultaneously by producing a ‘wafer’ which comprises an array of many chips. To convert the wafer into the individual chips the wafer is ‘diced’ which typically will be via multiple passes of a slitting saw.

In preferred examples the fluidic chip comprises one or more side walls, and the overmould casing comprises at least one pressure transferring window arranged, in use, to transfer pressure at the inlet side of the overmould casing to the one or more side walls of the fluidic chip; and/or, the overmould casing comprises one or more chip locating windows, by which the chip is located when the casing is injection moulded around the fluidic chip; and the method further comprises the step of: partially or fully filling said one or more chip locating windows and/or at least one pressure transferring window with an elastomer.

The windows—which may as previously discussed be defined by a chip locator used to hold or support the fluidic chip during the injection moulding process—may be filled with an elastomer during a secondary moulding process. The secondary moulding process may be performed after the initial moulding process in which the overmould is provided around the fluidic chip. The secondary moulding process may comprise an injection moulding or potting process. The elastomer is preferably arranged to transfer pressure to one or more side walls of the fluidic chip through the windows.

BRIEF DESCRIPTION OF THE DRAWINGS

An example insert and nozzle will now be described by way of example with reference to the accompanying drawings, in which.

DETAILED DESCRIPTION

Figure 1:
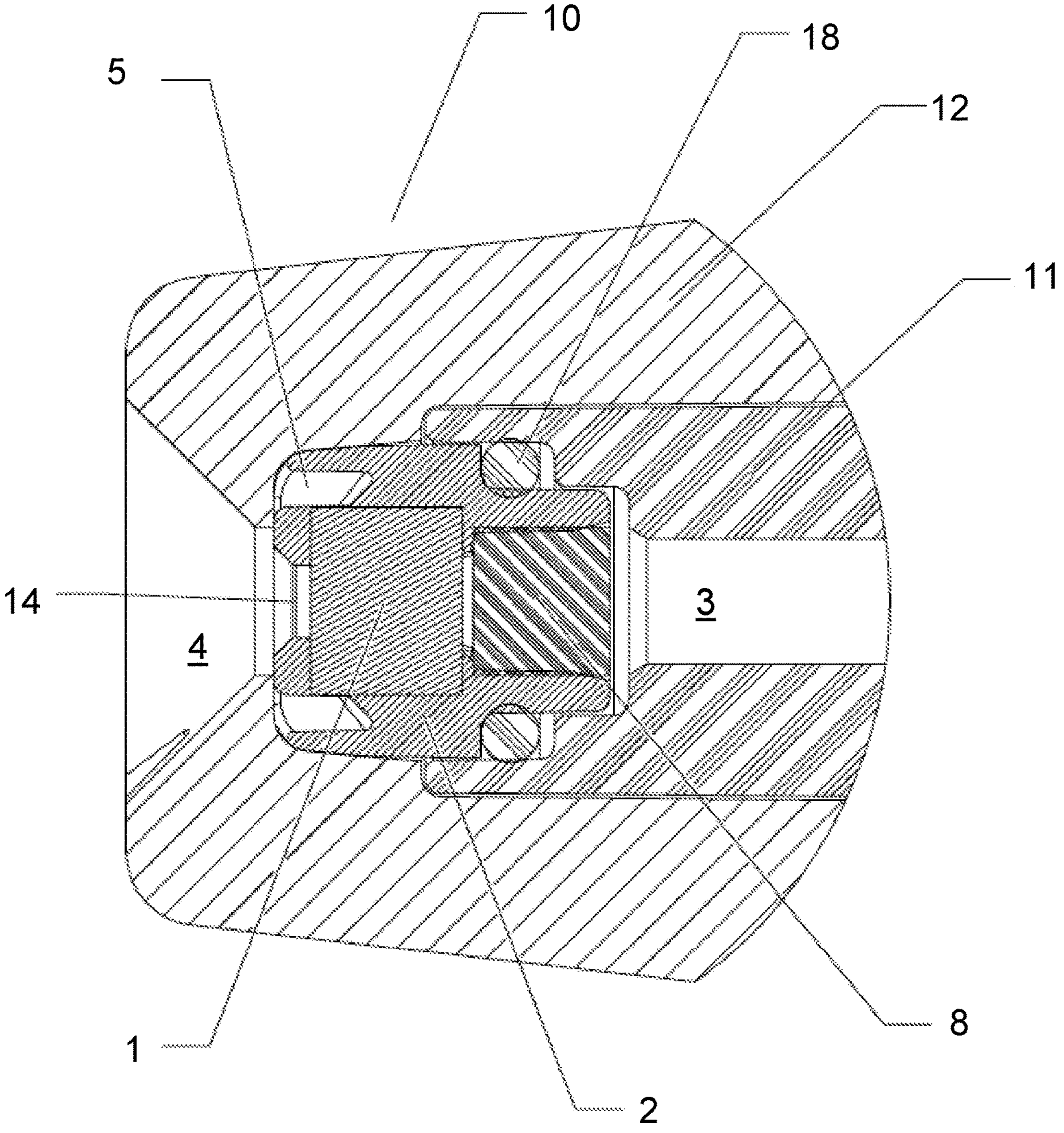
FIG. 1 schematically illustrates an example nozzle, comprising an example insert, in one exemplary configuration.

A portion of an example nozzle 10 is generally illustrated in an assembled configuration in FIG. 1. The example nozzle 10 comprises a housing assembly which houses an insert.

The insert comprises a microfluidic chip 1 encased by an overmould casing 2. In this example the microfluidic chip 1 (also termed a "fluidic chip" or "microfabricated fluidic chip" herein) is a microfabricated chip having microfluidic channels. The chip 1 comprises an inlet side 3 and an outlet side 4. Generally, the chip 1 comprises a chip inlet consisting of one or more openings on the inlet side 3 of the chip 1, arranged to allow the intake of fluid into the chip from the inlet side 3. On the outlet side 4, the chip 1 comprises a chip outlet which consists generally of a single opening to allow the output of fluid from the chip to the outlet side 4. Whilst the example chip of FIG. 1 comprises a chip outlet having a single opening, in other examples the chip outlet may consist of a plurality of openings. Inside the chip 1 are fluidic channels which direct or guide fluid from the chip inlet to the chip outlet. In use fluid is expelled from the nozzle 10 through nozzle outlet 14.

The microfluidic chip 1 of the example shown in FIG. 1 is generally cuboid, and has a rectangular cross section both laterally and longitudinally. Unless otherwise stated, the term 'longitudinally' should be understood as meaning the intended direction of movement, in use, of fluid through the insert and nozzle. In the example shown in FIG. 1, such a longitudinal axis extends parallel to the straight line joining the inlet side 3 and the outlet side 4 of the chip.

The chip 1 is encased in an overmould casing 2. In the manufacturing process, the chip 1 is overmoulded with a rigid polymer outer casing. This can be achieved for example by injection moulding a polymer over the chip by use of a suitable mould or cast. The chip 1 can be held in position within the overmoulded casing 2 through chip locating windows 5, described in more detail below. During the cooling stage of the injection moulding process, the polymer overmould is allowed to shrink, which results in compression of the overmoulded casing onto the chip to substantially encase the chip 1 with a tight seal. The chip 1 interface is thus surrounded and tightly sealed by the overmould casing 2. As a result, the fluidic chip 1 takes on an external form factor which is dictated by the form of the overmould casing 2. The overmoulding process provides a good seal around the external interface of the fluidic chip 1. The seal can be further improved by using a further treatment process, such as chemical bonding. In such a process the four lateral sides of the cuboidal chip are coated with a bonding agent before overmoulding. Then, when the chip 1 is inserted and overmoulded a true chemical bond can be achieved between the chip 1 and the overmould casing 2, which delivers a more robust seal than relying on the polymer shrinkage alone.

The overmould casing 2 can take any required shape or form to suit the dimensional needs of the nozzle 10. However, the casing 2 is overmoulded around the chip 1 so as to ensure that the chip inlet and chip outlet are not totally obstructed. In this example, the casing 2 has been overmoulded around the chip 1 so as to leave the chip inlet and chip outlet fully exposed. In other words, the overmould casing 2 comprises an inlet opening in fluid communication with the chip inlet, and an outlet opening in fluid communication with the chip outlet.

Generally, the overmould casing 2 has a shape which compliments the internal shape and size of the housing assembly of the nozzle, so as to provide a tight fit. The overmould casing 2 effectively converts the cuboidal form of the microfabricated chip 1 into one which is more readily and effectively sealed at high pressures within the nozzle system 10. In particular, the overmould casing 2 generally has a form which corresponds to, or matches, the internal form and dimensions of the nozzle housing assembly (also referred to as 'the housing'). In this example, the nozzle housing assembly is cylindrical, and the overmould casing 2 is cylindrical. The cylindrical form of the overmould casing 2 allows easy integration of the fluidic chip 1 into a nozzle system 10 which typically has a cylindrical housing assembly. In other examples, the overmould casing 2 may have a conical form, and may be arranged to fit within a tapered internal wall of the housing assembly.

The housing assembly of the nozzle has the role of housing components of the nozzle system 10. The insert is mounted and held in place within the nozzle housing assembly via the overmould casing 2. The housing assembly can take many forms, as long as the function of housing components is fulfilled, but the example nozzle system 10 of FIG. 1 advantageously employs a housing assembly comprising a male housing 11 and a female housing 12. When assembled, the male housing 11 is at least partially inserted within the internal volume of the female housing 12.

In this example, the insert—i.e. chip 1 encased by the overmould casing 2—is mounted within the female housing 12 and at least partially within the male housing 11. As can be seen in FIG. 1, the insert abuts a surface of the male housing 11 at an inlet end 3 of the insert and also abuts an internal surface of the female housing 12 at an outlet end 4 of the insert. Effectively, the insert is 'sandwiched' between the male housing 11 and the female housing 12 of the nozzle system.

The overmould casing 2 comprises a retainer to provide a means for securely mounting the insert within the housing assembly of the nozzle system 10. In the example shown in FIG. 1, the retainer is a flange which allows the insert to rest against and be tightly held within the housing assembly. In particular, in the exemplary nozzle shown, the flange abuts the male housing 12. An o-ring 18 is provided between the flange and the male housing 11 so as to provide a tight seal. The o-ring 18 also provides some shock absorption so as to improve safety and structural integrity of the nozzle 10. Whilst most examples herein are described as having a polymer overmoulded casing 2, in some examples the rigid polymer casing 2 is replaced by one which is elastomeric. The elastomeric overmould can include external features which replicate or replace those provided by the o-ring, for example, thus reducing part count.

Figure 2:
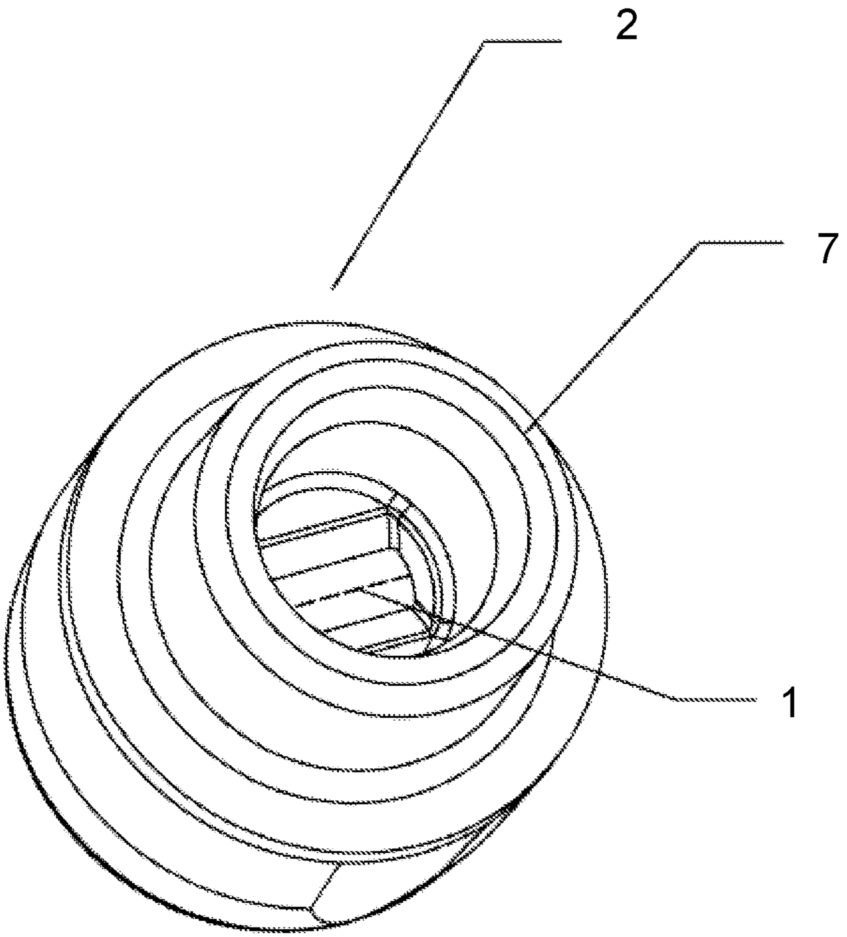
FIG. 2 schematically illustrates an example overmould casing in one exemplary configuration.

The example overmould casing 2, which can be seen in more detail in FIG. 2, comprises a sub-housing 7. The sub-housing 7 is integral with the rest of the overmould casing 2, and is arranged to house or encase a functional component of the nozzle system 10. In this example, the sub-housing 7 encases a porous filter 8. The porous filter 8 is arranged upstream of the chip 1 so as to filter the fluid before it enters the fluidic chip 1. In other examples the sub-housing 7 and components such as porous filter 8 can be positioned downstream of the chip 1. In this example, the sub-housing 7 is a substantially cylindrical protrusion which is monolithic with the rest of the overmould casing 2, and the porous filter is a cylindrical porous filter 8. In other examples the sub-housing can take other forms and can also be a separate component which is attached to the overmould casing 2 during assembly.

The example overmould casing 2 comprises windows. In particular, the casing 2 comprises chip locating windows 5 on an outlet side 4 of the casing 2. As noted above, the casing 2 is overmoulded around the chip 1 during manufacture, and the chip 1 can be held and maintained in the desired position within the casing 2 through the chip locating windows 5. The chip locating windows 5 in this example are positioned at the outlet end 4 of the overmould casing 2, though in some examples the chip locating windows 5 may be provided at other positions around the chip 1, for example at the lateral walls or at the inlet end 3.

As well as providing an opening through which the chip 1 can be held during manufacture and overmoulding, the chip locating window 5 can also provide further practical functionality such as transfer of ambient or system pressure to the chip 1. The function of system pressure transfer will be described in more detail below with reference to a modified example nozzle system.

Figure 3:
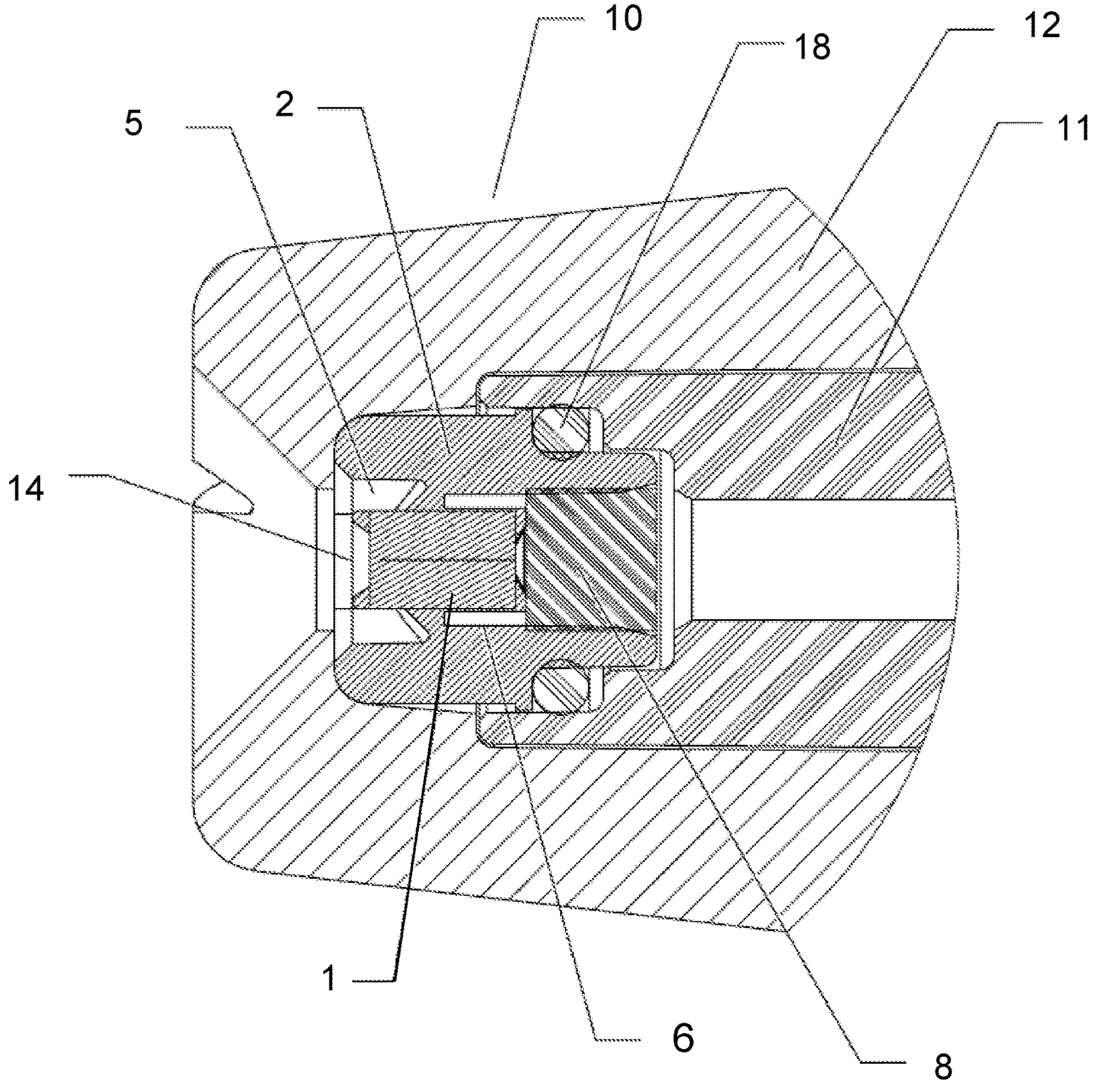
FIG. 3 schematically illustrates an example nozzle, comprising an example insert, in one exemplary configuration.

A portion of another example nozzle 10 is illustrated in an assembled configuration in FIG. 3. The example nozzle system 10 comprises a housing assembly which houses an insert, and shares many features in common with the example nozzle described above with respect to FIG. 1. Corresponding components that are shared between this nozzle 10 and the examples in the previous figures share corresponding reference signs.

Figure 4:
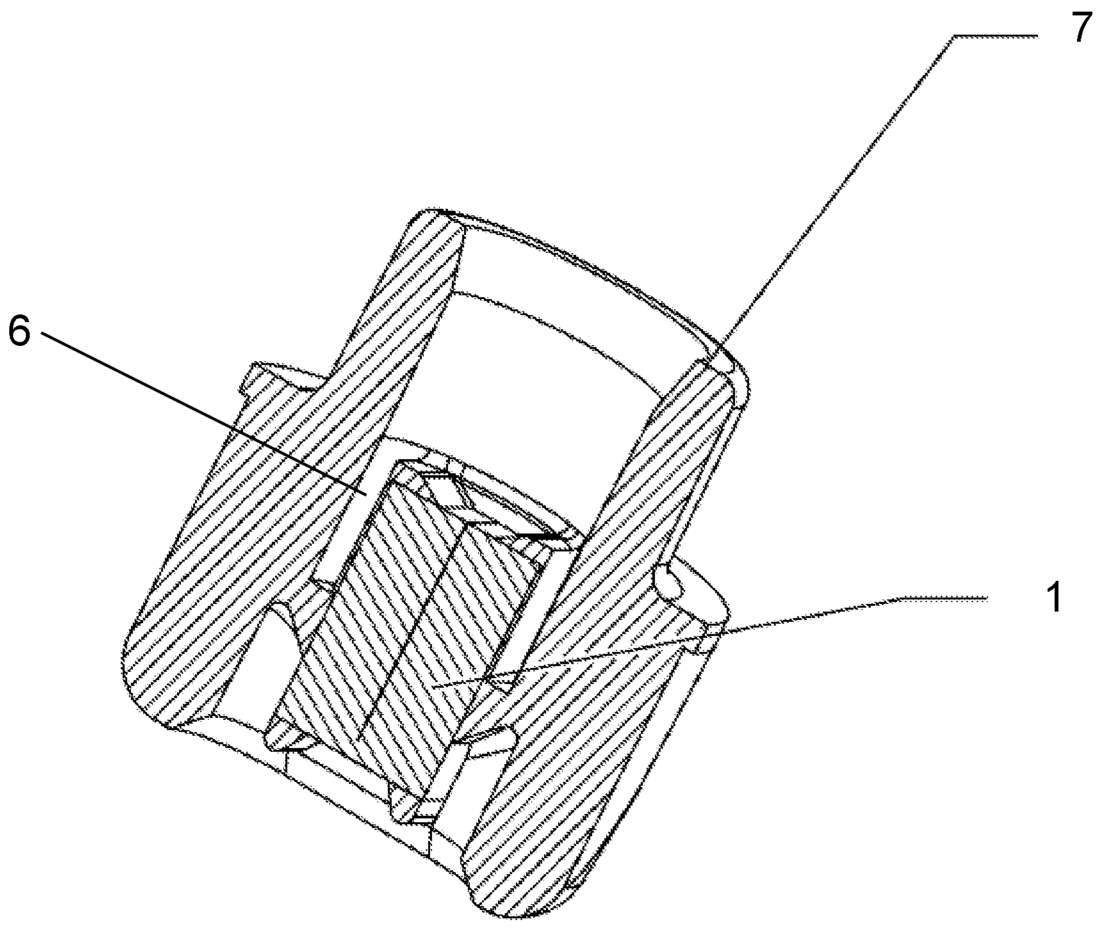
FIG. 4 schematically illustrates an example overmould casing in one exemplary configuration.

However, in this example, the overmould casing 2 further comprises pressure transferring windows 6. The pressure transferring windows 6 are provided on an inlet side 3 of the overmould casing 2 such that, in use, the external walls of the chip 1 are exposed to the system hydraulic pressure inside the nozzle 10. In particular the external lateral side walls of the chip 1 are exposed to the system hydraulic pressure. This hydraulic pressure effectively clamps the layers of the microfabricated chip 1 together thus maintaining the bond which holds the chip 1 together. FIG. 4 shows a detailed view of the overmould casing 2 and chip 1 according to this example.

In this example, each of the pressure transferring windows 6 comprises an opening through which at least a portion of the chip 1 is exposed to an inlet side 3 of the insert. In other words, the exposed portion of the chip 1 is in fluid communication with the internal volume of the nozzle housing at the inlet side 3. In addition to an opening, the pressure transferring window 6 can comprise open channels for transferring the exposure of the chip 1 from one side of the chip to another. In other examples, each pressure transferring window 6 can comprise a thin membrane or a monolithic region of reduced thickness in the overmould casing 2, such that a means for transferring pressure is provided without fully exposing the chip 1 through an opening. In some examples a combination approach can be taken, wherein the pressure transferring window 6 comprises elements which partially expose the chip, for example a meshed opening.

In use, the inlet side of the insert is pressurised to a high pressure with the working fluid. As the fluid passes through the fluidic channels of the chip 1, the internal volume and surfaces of the chip 1 experience a high pressure. Normally, such pressures can act to damage or delaminate the chip 1. However, by having the pressure transferring windows 6, high pressure is also applied to the external surfaces of the chip 1, thereby forcing the chip 1 to stay intact. As described above, fluidic chips are often made of two layers or 'halves' which are compressed together in manufacture. The pressure transferring window 6 can be provided at the opposing halves so as to provide, in use, hydraulic pressure against the chip 1 so as to clamp the two halves or layers together. This principle can be employed with chips having any number of layers, wherein the pressure transferring windows are arranged to provide pressure to clamp all of the layers of the chip together.

In some examples, locating windows (such as the chip locating windows 5 described above) can also provide an additional function of transferring pressure. A chip locating window 5 can for example be positioned at an inlet side 3 of the chip 1, such that the opening of the chip locating window 5 also exposes the chip 1 to system hydraulic pressure, in the same manner as that describe for the pressure transferring window 6.

Figure 5:
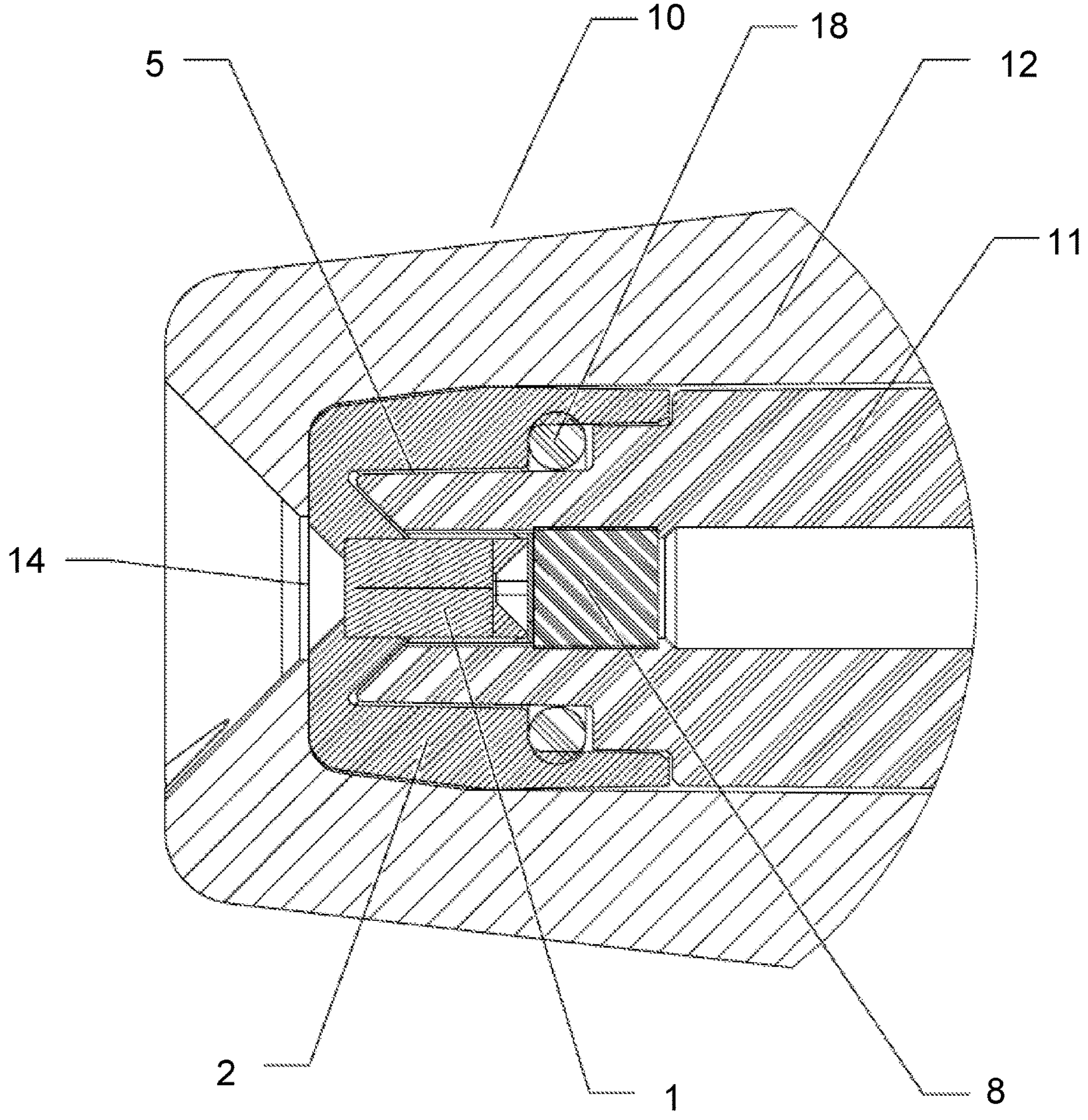
FIG. 5 schematically illustrates an example nozzle, comprising an example insert, in one exemplary configuration.

An example nozzle system 10 in which such an approach is adopted is illustrated in FIG. 5. The overmould casing 2 is shown in further detail, as viewed from the inlet side, in FIG. 6.

Figure 6:
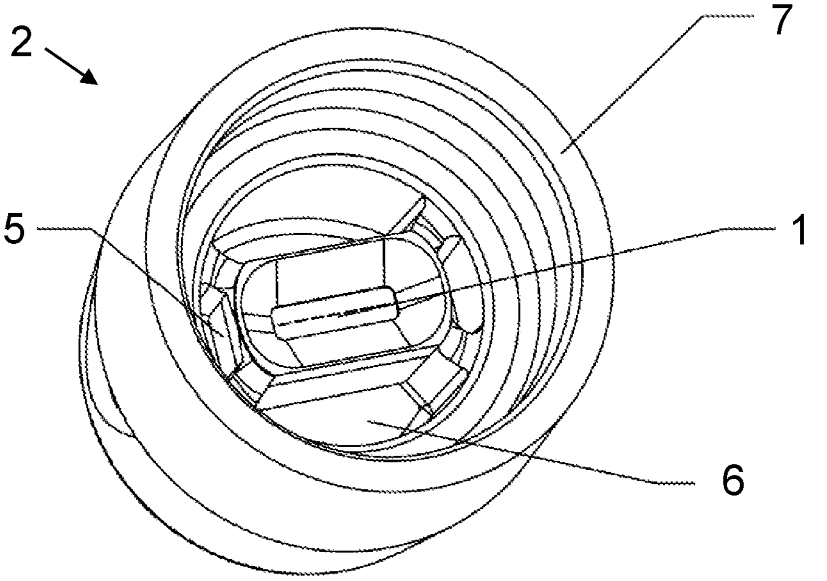
FIG. 6 schematically illustrates an example overmould casing in one exemplary configuration.

It can be seen from FIG. 6 that in this example the overmould casing 2 comprises two pressure transferring windows 6 and two chip locating windows 5 on the inlet side of the chip 1. Here, the windows 5 which are used for locating the chip when overmoulding the casing 2 can also provide the function of transferring the system pressure to the side walls of the fluidic chip 1. Similarly, the pressure transferring windows 6 may allow for the fluidic chip to be located during overmoulding.

The example illustrated in FIG. 5 also shows how other features of the nozzle can also be varied. In this variation, the retainer of the casing 2 is an internal flange, or counterbore, within the internal volume of the casing 2, and the casing is arranged to accept within its volume a portion of the male housing 11. The o-ring seal 18 is now housed in the counterbore, between the casing 2 and the male housing 11. Furthermore, in this example, the male housing 11 now has the sub-housing (instead of the overmould casing 2) which holds the porous filter 8. In some examples both the casing 2 and the male housing 11 can comprise a sub-housing.

Figure 7:
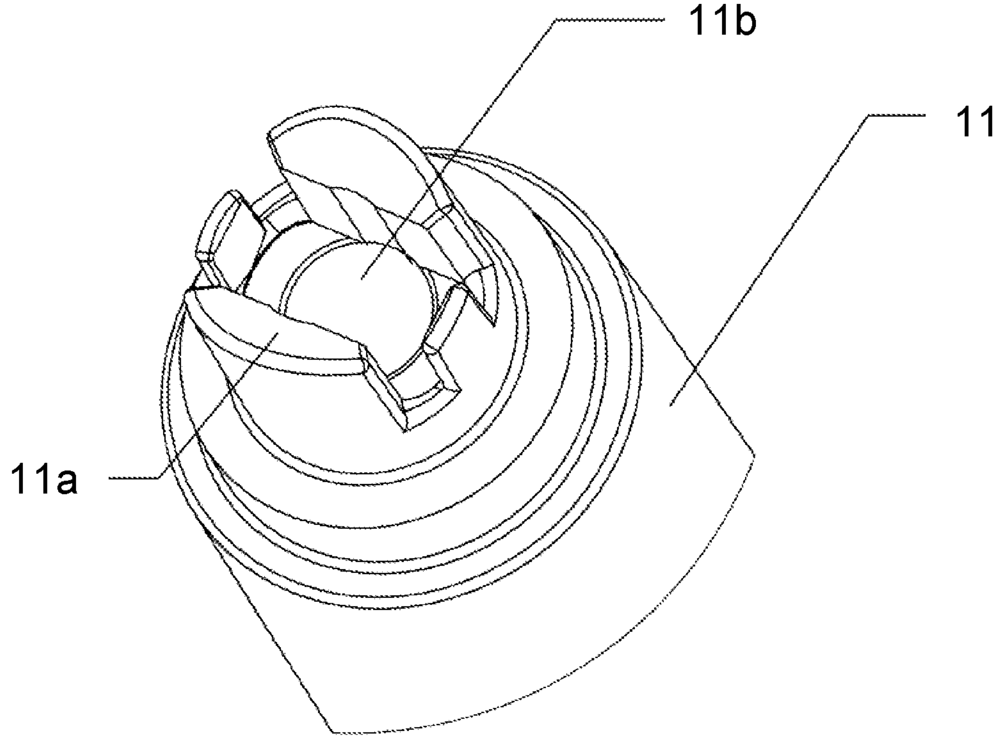
FIG. 7 schematically illustrates an example male housing of a nozzle in an exemplary configuration.

To minimise the volume of free space, which can result in the formation of air pockets, the male housing 11 comprises protrusions 11*a* which fill the otherwise empty spaces within the overmould casing 2. The protrusions 11*a* on the male housing 11 are shown in further detail in FIG. 7. The protrusions 11*a* are arranged to be complementary in shape and size to the internal and/or external form of the overmould casing 2. When assembled, as can be seen in FIG. 5, the protrusions 11*a* engage the overmould casing 2 so as to provide a tightly sealed fit, holding the insert in place and ensuring isolation of pressure across the inlet and outlet sides of the chip 1. As well as reducing the formation of air pockets, the protrusions 11*a* provide a further function of increasing structural rigidity and improving the tight seal for the insert within the nozzle system 10.

An alternative approach for avoiding trapped air pockets within the windows 5, 6 of an overmould casing 2 is to fill the windows 5, 6 with an elastomer 19 (e.g. a natural or synthetic rubber). Advantageously, such an approach still allows for loads such as hydraulic pressure to be transmitted to the fluidic chip 1 within the overmould casing 2 through the window via the deformable, resilient elastomer 19 provided within said windows 5, 6.

Figure 8:
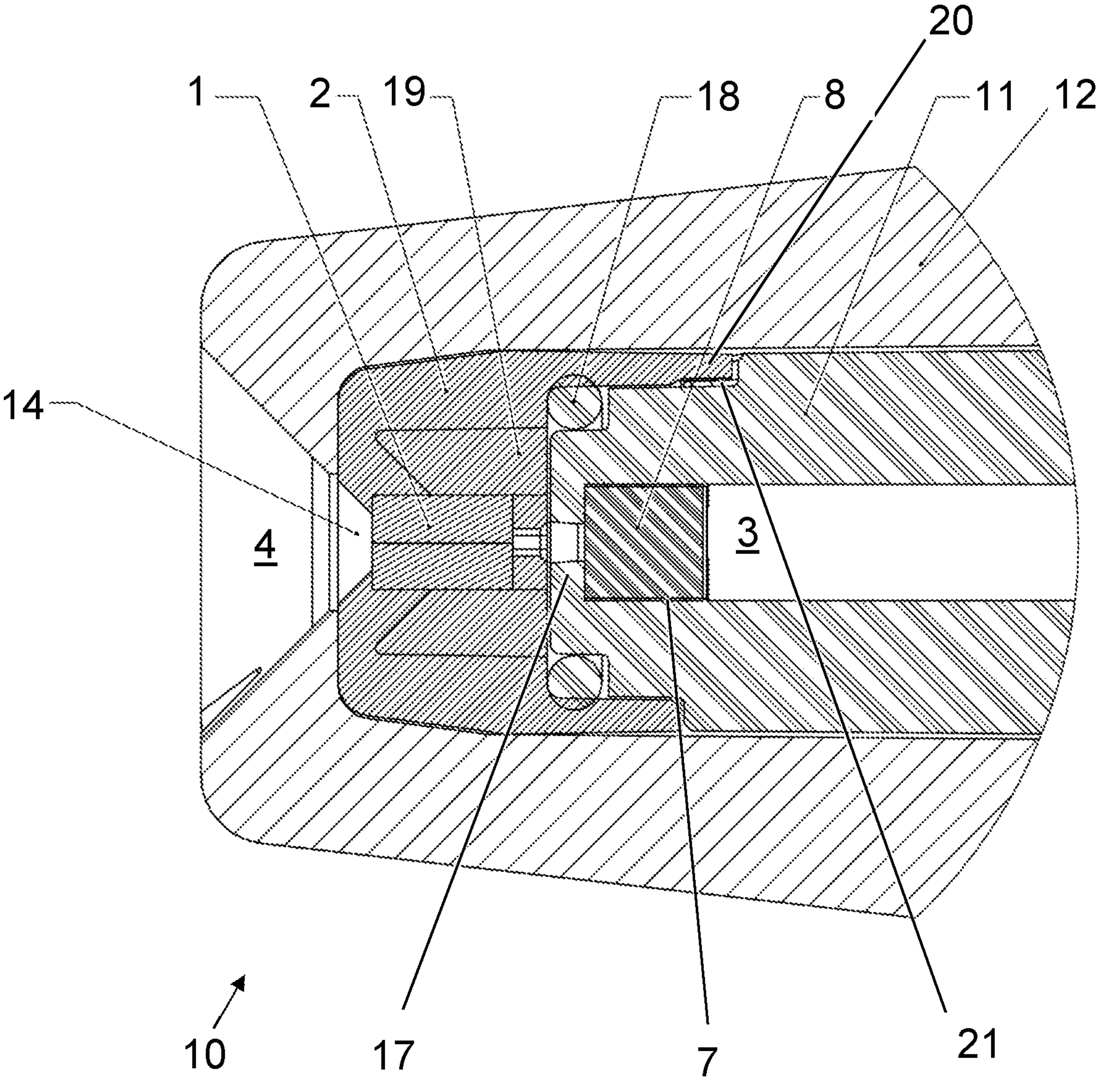
FIG. 8 schematically illustrates an example nozzle, comprising an example insert, in one exemplary configuration.

An exemplary nozzle 10 that exhibits this approach is shown in FIG. 8. Corresponding components that are shared between this nozzle 10 and the examples in the previous figures share corresponding reference signs.

The nozzle 10 comprises an assembly formed of a male housing 11 and a female housing 12 between which is received an insert. The insert comprises an overmoulded fluidic chip 1 formed of two layers. The fluidic chip 1 is substantially cuboidal and comprises an inlet side 3 and an outlet side 4. As in previous examples, the fluidic chip 1 is surrounded or encased by an overmould casing 2 such that an inlet in the inlet side 3 and an outlet in the outlet side 4 of the fluidic chip are exposed. The overmould casing 2 is a rigid polymer that is moulded (e.g. by injection moulding) over and around the fluidic chip 1 using a suitable mould.

Figure 9A:
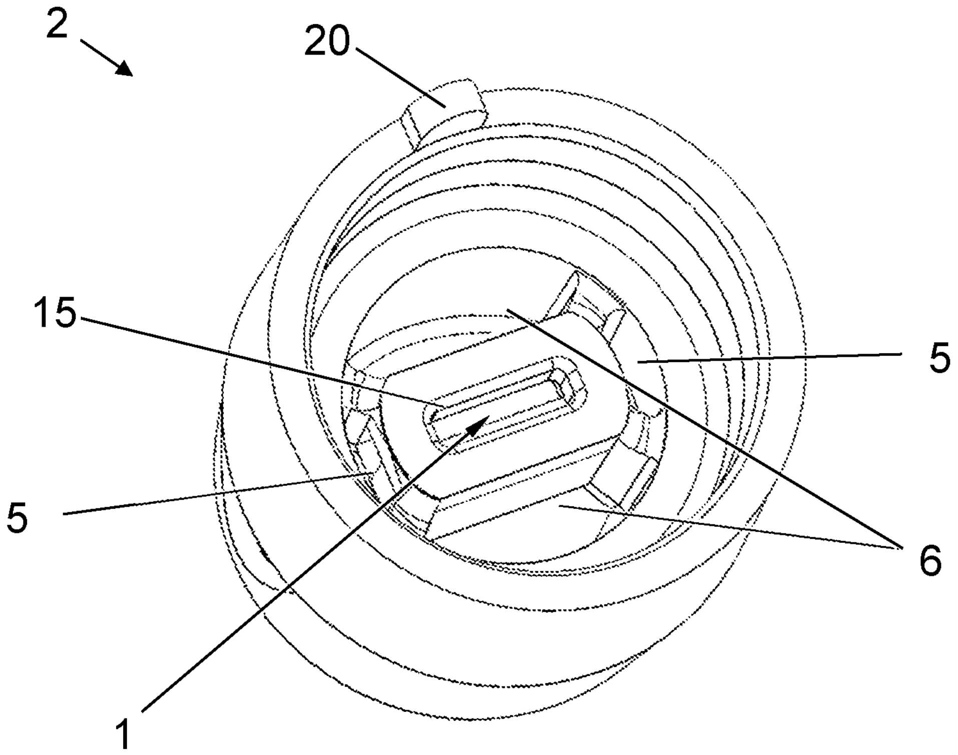
FIG. 9*a* schematically illustrates an example overmould casing in one exemplary configuration during manufacture.

The arrangement of the fluidic chip 1 and overmould casing 2 following the moulding process is shown in FIG. 9*a* which shows the overmould casing 2 from its inlet side. As will be seen, four windows (cavities or voids) within the overmould casing 2 in which no rigid polymer is present and by which the fluidic chip 1 may be accessed or inspected. These windows may have been defined by the extent of a chip locator (or similar device) which was used to hold or support the fluidic chip 1 during the overmoulding process. Two pressure transferring windows 6 are arranged on the opposing sides of the fluidic chip 1, specifically on the sides of the fluidic chip 1 which extend parallel to the interface between the different layers of the fluidic chip 1. Thus each pressure transferring window 6 opens onto or accesses a different layer of the fluidic chip 1. Pressure applied across the pressure transferring windows 6 will therefore act to push the two layers of the fluidic chip 1 together. Additionally, a chip locating window 5 is located on each of the opposing sides of the fluidic chip 1 that extend perpendicular to the interface between the different layers of the fluidic chip 1.

Returning to FIG. 8, it will be further seen that in the assembled nozzle 10 that the pressure transferring windows 6 of the overmould casing 2 are filled by elastomer 19, as mentioned above. Indeed, both the pressure transferring windows 6 and two chip locating windows 5 of the overmould are entirely or fully filled by elastomer (although in further examples one or more of the windows 5, 6 may only be partially filled or unfilled).

The windows 5, 6 are filled with elastomer 19 in a secondary moulding process (e.g. using injection moulding or potting) that is performed after the initial overmoulding step used to form the overmould casing around the fluidic chip 1. The arrangement of the fluidic chip 1, overmould casing 2 and elastomer 19 following this secondary moulding process is shown in FIG. 9*b*.

Together the fluidic chip 1, overmould casing 2 and elastomer 19 form an insert for the nozzle 10 and in use are received between the male housing 11 and female housing 12. An o-ring 18 is provided between the overmould casing 2 and the male housing 12 to provide a tight (e.g. watertight, gastight) seal. However, in further examples the elastomer 19 may be extended from the around the bore of the overmould casing 2 so as to perform the same function and replace the o-ring 18.

As will be seen from FIG. 8, a porous filter 8 is provided upstream of the fluidic chip 1. The porous filter 8 is located and enclosed within a sub-housing 7 within the male housing 11 of the nozzle 10. A filter retaining wall 17 is provided between the porous filter 8 and the insert comprising the fluidic chip 1. Thus the porous filter 9 and the fluidic chip 1 are separated by the filter retaining wall 17. In use, a substantial hydraulic impulse is applied to the porous filter 8 along the longitundinal direction as the device incorporating the nozzle 10 is fired. This impulse will be transmitted from the porous filter 8 to the filter retaining wall 17 rather than directly to the fluidic chip 1 or overmould casing 2. This protects the fluidic chip 1 from this impulse loading, extending the life of the nozzle. In alternative examples, the filter retaining wall may be formed as part of the overmould casing.

Figure 9B:
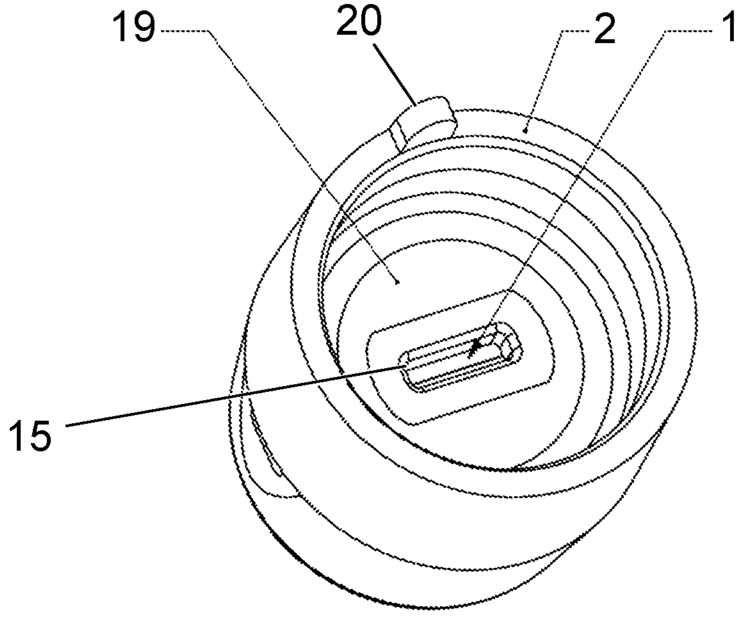
FIG. 9*b* schematically illustrates the example overmould casing of FIG. 9*a* in one exemplary configuration following manufacture.

As will also be seen from FIGS. 9*a* and 9*b* the overmould casing 2 comprises an overmould casing inlet 15 through which an inlet side of the fluidic chip 1 is exposed and through which fluid may travel to the inlet of the fluidic chip 1. The overmould casing inlet 15 is formed as a slot, having a high aspect ratio, and extends in substantially the same plane as the interface of the layers within the fluidic chip 1. As such, fluid may easily pass through the long, narrow overmould casing inlet 15 to the microfluidic channels between the layers of the fluidic chip 1.

The male housing 11 comprises a male housing outlet 16 that extends through the filter retaining wall 17. The male housing outlet 16 is again slot-shaped as will be seen from FIG. 10 which schematically shows a perspective view of the male housing outlet 16. Thus the shape of the male housing outlet 16 conforms to the shape of the overmould casing inlet 15 so as to allow for fluid to easily flow between these components in use.

As will be seen, the male housing outlet 16 is flared (although this is not essential). Thus a smooth transition is provided between a circular aperture at the interior surface of the filter retaining wall 17 and the slot-shaped exterior of the male housing outlet 16 at the exterior surface of the filter retaining wall 17. This tapered internal surface of the male housing outlet 16 provides a smooth transition between the interior and exterior surfaces of the filter retaining wall 17.

Figure 10:
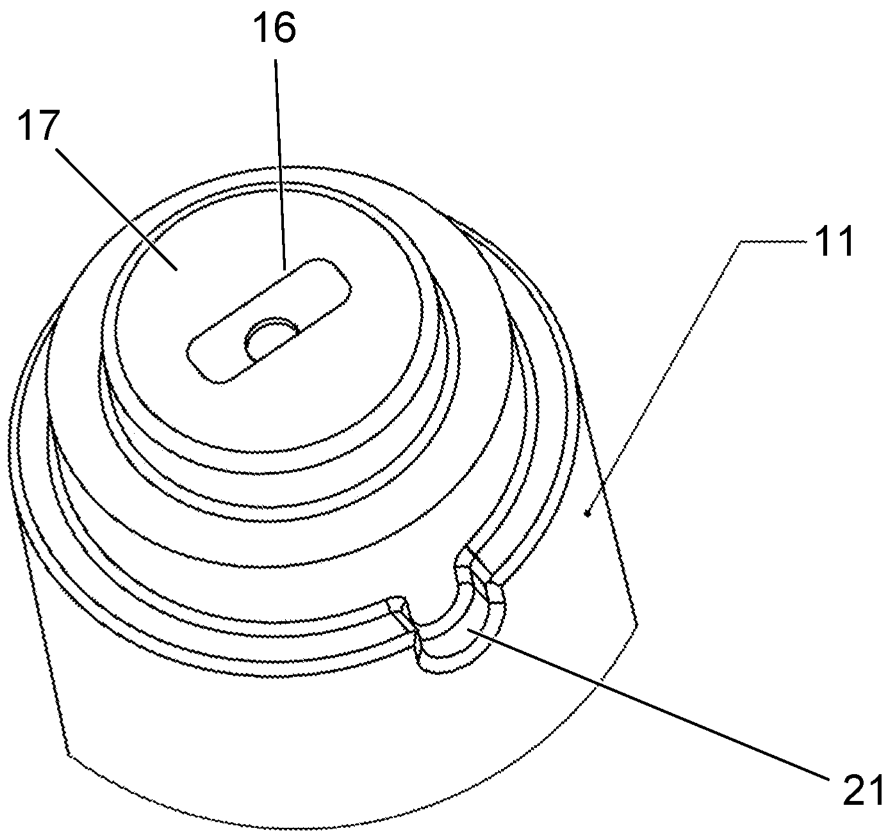
FIG. 10 schematically illustrates an example male housing of a nozzle in an exemplary configuration.

As will be seen from FIGS. 8 to 10 there is provided a circumferential positioning projection 20 on the overmould casing 2 and a corresponding circumferential positioning recess 21 on the male housing 11. The circumferential positioning recess 21 is configured to receive and retain the circumferential positioning projection 20 when the overmould casing 2 and male housing are correctly aligned relative to one another in the circumferential direction. In this example, correct alignment is achieved where the slot-shaped overmould casing inlet 15 and the male housing oulet 16 are parallel. However, in further examples different alignments may be desired. It will be seen that engagement between the overmould casing 2 and the male housing 11 is prevented whilst these alignment components are misaligned. In alternative embodiments the projection may be provided on the male housing 11, whilst the recess is provided on the overmould casing 2. Such projections and recesses allow for the overmould casing 2 and male housing 11 to be quickly, easily and reliably assembled.

It will be appreciated that each of the additional modifications introduced in relation to the nozzle 10 shown in FIGS. 8 to 10—including the elastomer filled windows, filter retaining wall, overmould casing inlet, male housing outlet and the circumferential positioning projections and recesses—could each separately be combined with or incorporated into any of the previous examples.

As will be appreciated from the above, the present invention, by providing an innovative insert for a nozzle system in which a casing is overmoulded around a fluidic chip which is then tightly sealed within the nozzle, enables the provision of a nozzle device which is compact, reliable, structurally robust and which delivers high pressure high velocity fluid ejection from the nozzle outlet.

Exemplary embodiments in accordance with the invention are set out in the following numbered clauses:

Numbered Clause 1. An insert for a micro-nozzle, the insert comprising:

a microfabricated fluidic chip having an inlet, an outlet and one or more microfluidic channels connecting the inlet and outlet;

an overmould casing overmoulded around the fluidic chip so as to substantially encase the fluidic chip, and comprising an inlet in fluid communication with the inlet of the chip and an outlet in fluid communication with the outlet of the chip.

Numbered Clause 2. An insert according to numbered clause 1 wherein the overmould casing further comprises a retainer for mounting the insert in a housing of a micro-nozzle such that, in use, pressure at an inlet side of the casing is isolated from pressure at an outlet side of the casing.

Numbered Clause 3. An insert according to any of numbered clauses 1 and 2 wherein the fluidic chip comprises one or more side walls, and the overmould casing comprises at least one pressure transferring window arranged, in use, to transfer pressure at the inlet side of the overmould casing to the one or more side walls of the fluidic chip.

Numbered Clause 4. An insert according to any preceding numbered clause wherein the overmould casing comprises a sub-housing at least partially encasing a porous filter adjacent to the inlet of the fluidic chip.

Numbered Clause 5. An insert according to any preceding numbered clause wherein the overmould casing comprises one or more chip locating windows, through which the chip can be located when the casing is overmoulded around the fluidic chip.

Numbered Clause 6. An insert according to any preceding numbered clause wherein the overmould casing comprises chip locating windows on the inlet side of the insert and, optionally, the chip locating windows are arranged, in use, to transfer pressure at the inlet side of the overmould casing to lateral surfaces of the fluidic chip.

Numbered Clause 7. An insert according to any preceding numbered clause wherein the overmould casing comprises chip locating windows on the outlet side of the insert and, optionally, the nozzle locating windows are arranged, in use, to transfer pressure at the outlet side of the overmould casing to the fluidic chip.

Numbered Clause 8. An insert according to any of numbered clauses 3 to 7 wherein the chip comprises at least a first layer and a second layer, wherein at least one pressure transferring window in the overmould casing is arranged, in use, to transfer hydraulic pressure against the chip so as to clamp the first and second layers of the chip together.

Numbered Clause 9. An insert according to numbered clause 8 wherein the first layer comprises glass and the second layer comprises silicon.

Numbered Clause 10. An insert according to any preceding numbered clause wherein the overmould casing comprises one or more chip locating windows and/or at least one pressure transferring window, and wherein said one or more chip locating windows and/or at least one pressure transferring window are partially or fully filled with an elastomer, wherein preferably the elastomer is arranged to transfer pressure to one or more side walls of the fluidic chip.

Numbered Clause 11. A micro-nozzle comprising:

a female housing enclosing a nozzle chamber and having a nozzle outlet;

an insert according to any preceding numbered clause positioned within the nozzle chamber such that the outlet side of the insert is adjacent to and in fluid communication with the nozzle outlet;

a male housing arranged to channel fluid from a fluid source to the inlet side of the insert, the male housing having a ridge arranged to engage the flange of the insert so as to seal the insert in place within the female housing.

Numbered Clause 12. A micro-nozzle according to numbered clause 11 wherein the male housing and the insert engage each other via an o-ring.

Numbered Clause 13. A micro-nozzle according to any of numbered clauses 11 and 12 wherein the insert comprises one or more female bores and the male housing comprises one or more protrusions which engage the female bores of the insert so as to fill the space within each bore.

Numbered Clause 14. A micro-nozzle according to any of numbered clauses 11 to 13 wherein the male housing comprises a sub-housing encasing a porous filter arranged to filter the fluid upstream of the insert.

Numbered Clause 15. A micro-nozzle according to any of numbered clauses 11 to 14, comprising a porous filter arranged to filter the fluid upstream of the fluidic chip and wherein the fluidic chip and porous insert are separated by a filter retaining wall.

Numbered Clause 16. Use of the micro-nozzle according to any of numbered clauses 11 to 15 in a drug delivery device.

Numbered Clause 17. A method of manufacturing a micro-nozzle, comprising the steps of:

providing a fluidic chip having an inlet and an outlet;

injection moulding an overmould case around the fluidic chip so as to substantially encase the chip, leaving the inlet and outlet of the chip exposed;

allowing the overmould to shrink around the chip so as to provide a tightly sealed casing around the chip, and mounting the overmould casing in a housing of a nozzle system.

Numbered Clause 18. A method of manufacturing a micro-nozzle according to numbered clause 17, wherein:

the fluidic chip comprises one or more side walls, and the overmould case comprises at least one pressure transferring window arranged, in use, to transfer pressure at the inlet side of the overmould casing to the one or more side walls of the fluidic chip;

and/or, the overmould case comprises one or more chip locating windows, by which the chip is located when the casing is injection moulded around the fluidic chip;

and wherein the method further comprises the step of:

partially or fully filling said one or more chip locating windows and/or at least one pressure transferring window with an elastomer.

The invention claimed is:

1. An insert for a micro-nozzle, the insert comprising:

a microfabricated fluidic chip having an inlet, an outlet and one or more microfluidic channels connecting the inlet and the outlet;

an overmould casing overmoulded around the microfabricated fluidic chip to substantially encase the microfabricated fluidic chip, and comprising an overmould inlet that is in fluid communication with the inlet of the microfabricated fluidic chip and an overmould outlet that is in fluid communication with the outlet of the microfabricated fluidic chip; and wherein the overmould casing comprises one or more chip locating windows and/or at least one pressure transferring window, and wherein said one or more chip locating windows and/or said at least one pressure transferring window are partially or fully filled with an elastomer.

2. The insert according to claim 1 wherein the overmould casing further comprises a retainer for mounting the insert in a housing of the micro-nozzle such that, in use, an inlet pressure at an inlet side of the overmould casing is isolated from an outlet pressure at an outlet side of the overmould casing.

3. The insert according to claim 1 wherein the microfabricated fluidic chip comprises one or more side walls, and the overmould casing comprises the at least one pressure transferring window arranged, in use, to transfer pressure at an inlet side of the overmould casing to the one or more side walls of the microfabricated fluidic chip.

4. The insert according to claim 1 wherein the overmould casing comprises a sub-housing at least partially encasing a porous filter adjacent to the inlet of the microfabricated fluidic chip.

5. The insert according to claim 1 wherein the microfabricated fluidic chip is located through the one or more chip locating windows when the overmould casing is overmoulded around the microfabricated fluidic chip.

6. The insert according to claim 1 wherein the one or more chip locating windows are located on an inlet side of the insert and, optionally, the one or more chip locating windows are arranged, in use, to transfer pressure at an overmould casing inlet to lateral surfaces of the microfabricated fluidic chip.

7. The insert according to claim 1 wherein the one or more chip locating windows are located on an outlet side of the insert and, optionally, one or more nozzle locating windows are arranged, in use, to transfer pressure at an overmould casing outlet side of the overmould casing to the microfabricated fluidic chip.

8. The insert according to claim 1 wherein the microfabricated fluidic chip comprises at least a first layer and a second layer, wherein a pressure transferring window in the overmould casing is arranged, in use, to transfer hydraulic pressure against the microfabricated fluidic chip to clamp the first layer and the second layers together.

9. The insert according to claim 8 wherein the first layer comprises glass and the second layer comprises silicon.

10. The insert according to claim 1 wherein the elastomer is arranged to transfer pressure to one or more side walls of the microfabricated fluidic chip.

11. A micro-nozzle comprising:

a female housing enclosing a nozzle chamber and having a nozzle outlet;

the insert according to claim 1 positioned within the nozzle chamber such that an outlet side of the insert is adjacent to and in fluid communication with the nozzle outlet;

a male housing arranged to channel fluid from a fluid source to an inlet side of the insert, the male housing having a ridge arranged to engage a flange of the insert so as to seal the insert in place within the female housing.

12. The micro-nozzle according to claim 11 wherein the male housing and the insert engage each other via an o-ring.

13. The micro-nozzle according to claim 11 wherein the insert comprises one or more female bores and the male housing comprises one or more protrusions which engage the one or more female bores of the insert such that the one or more protrusions fill the one or more female bores.

14. The micro-nozzle according to claim 11 wherein the male housing comprises a sub-housing encasing a porous filter arranged to filter the fluid upstream of the insert.

15. The micro-nozzle according to claim 11, comprising a porous filter arranged to filter the fluid upstream of a fluidic chip and wherein the fluidic chip and porous insert are separated by a filter retaining wall.

16. Use of the micro-nozzle according to claim 11 in a drug delivery device.

17. A method of manufacturing a micro-nozzle, comprising:

providing a fluidic chip having one or more side walls, an inlet, and an outlet;

injection moulding an overmould case around the fluidic chip so as to substantially encase the fluidic chip, leaving the inlet and the outlet exposed, wherein the overmould case comprises at least one of one or more pressure transferring windows arranged, in use, to transfer pressure at an overmould casing inlet side of the overmould case to the one or more side walls of the fluidic chip, and/or one or more chip locating windows, by which the fluidic chip is located when the overmould case is injection moulded around the fluidic chip;

allowing the overmould case to shrink around the fluidic chip so as to provide a tightly sealed casing around the fluidic chip, mounting the overmould case in a housing of a nozzle system; and partially or fully filling said one or more chip locating windows and/or at least one pressure transferring window with an elastomer.

* * * * *